No. 729,767. Patented June 2, 1903.

UNITED STATES PATENT OFFICE.

GEORGE FRANÇOIS JAUBERT, OF PARIS, FRANCE.

PROCESS OF MAKING HYDRATED CALCIUM PEROXID.

SPECIFICATION forming part of Letters Patent No. 729,767, dated June 2, 1903.

Application filed December 27, 1900. Serial No. 41,249. (No specimens.)

*To all whom it may concern:*

Be it known that I, GEORGE FRANÇOIS JAUBERT, a citizen of the Republic of Switzerland, residing at Paris, France, have invented certain new and useful Improvements in the Manufacture of Hydrates of the Alkaline Earths and other Dioxids and in their Application to Bleaching, of which the following is a specification.

My invention relates to the manufacture of hydrates of the alkaline-earth and other dioxids and in their application to bleaching.

I have discovered that hydrates of sodium dioxid may be advantageously employed in the preparation by a double decomposition of the hydrates of the alkaline-earth and other dioxids. What is meant by "hydrate of bioxid of sodium" is the bodies corresponding to the formula $Na_2O_2 + 2$ to $10H_2O$.

Hitherto the hydrates of the alkaline-earth dioxids have only been prepared by the action of natural oxygenized water upon a solution of corresponding alkaline-earth hydrates. The hydrates of bioxids of lime, baryta, strontia have for formulas $CaO_2 + 2$ to $4H_2O$, $SrO_2 + 8H_2O$, $BaO_2 + 8H_2O$. The hydrates of the alkaline-earth peroxids have only been utilized for making a purer and more stable oxygenized water by removing the metal in an insoluble form—for example, as a sulfate, phosphate, or fluosilicate; but these hydrates, particularly those of calcium, have not been industrially manufactured.

I have discovered that the hydrate-of-sodium dioxid in the presence of alkaline-earth hydrates gives off its oxygen to them in the same manner as oxygenized water, causing formation of hydrates of the alkaline-earth peroxids and caustic soda. I have also found that by replacing solutions of alkaline-earth hydrates necessarily very poor in oxygen, hitherto alone employed for the preparation of the hydrates of the peroxids, by the alkaline-earth hydrates in a dry or pasty state or in a milk state there is obtained even better economical results in that more concentrated caustic soda is recuperated. I have found that I arrive at the same result by replacing the alkaline-earth hydrates with soluble salts, such as the chlorids, oxychlorids, sucrates, and the like.

I have also discovered that the hydration of the sodium dioxid and its transformation into hydrate-of-calcium dioxid may be carried on by a single operation. Seventy-four kilograms of slaked lime in a fine powder may be mixed with seventy-eight kilograms of sodium dioxid and the mixture subjected to the action of air while moist, but to be free from carbonic acid. When this mixture has absorbed from one hundred to two hundred kilograms of aqueous vapor—that is, when a sample to which a small quantity of water has been added no longer appreciably emits heat—the mixture is stirred with cold water—for example, with one thousand liters—and one proceeds as described in the example above given.

The hydrates of the alkaline-earth peroxids, and especially the hydrate-of-calcium dioxid, may be employed with advantage for bleaching wool, feathers, and other matter and for oxidizing processes in general.

Having thus described the nature and object of my invention, what I claim as new, and desire to secure by Letters Patent, is—

The process of manufacturing hydrate-of-calcium peroxid, which consists in mixing in a dry state powdered slaked lime and hydrate-of-sodium peroxid and in thereafter subjecting the dry mixture to moist air free from carbonic acid until the mixture has slowly absorbed a small quantity of moisture without heating the mixture.

In testimony whereof I have signed this specification in the presence of two subscribing witnesses.

GEORGE FRANÇOIS JAUBERT.

Witnesses:
C. DE MESTRAL,
EDWARD P. MACLEAN.